July 11, 1950
W. M. EWING ET AL
2,515,034
BATHYTHERMOGRAPH
Filed May 27, 1944
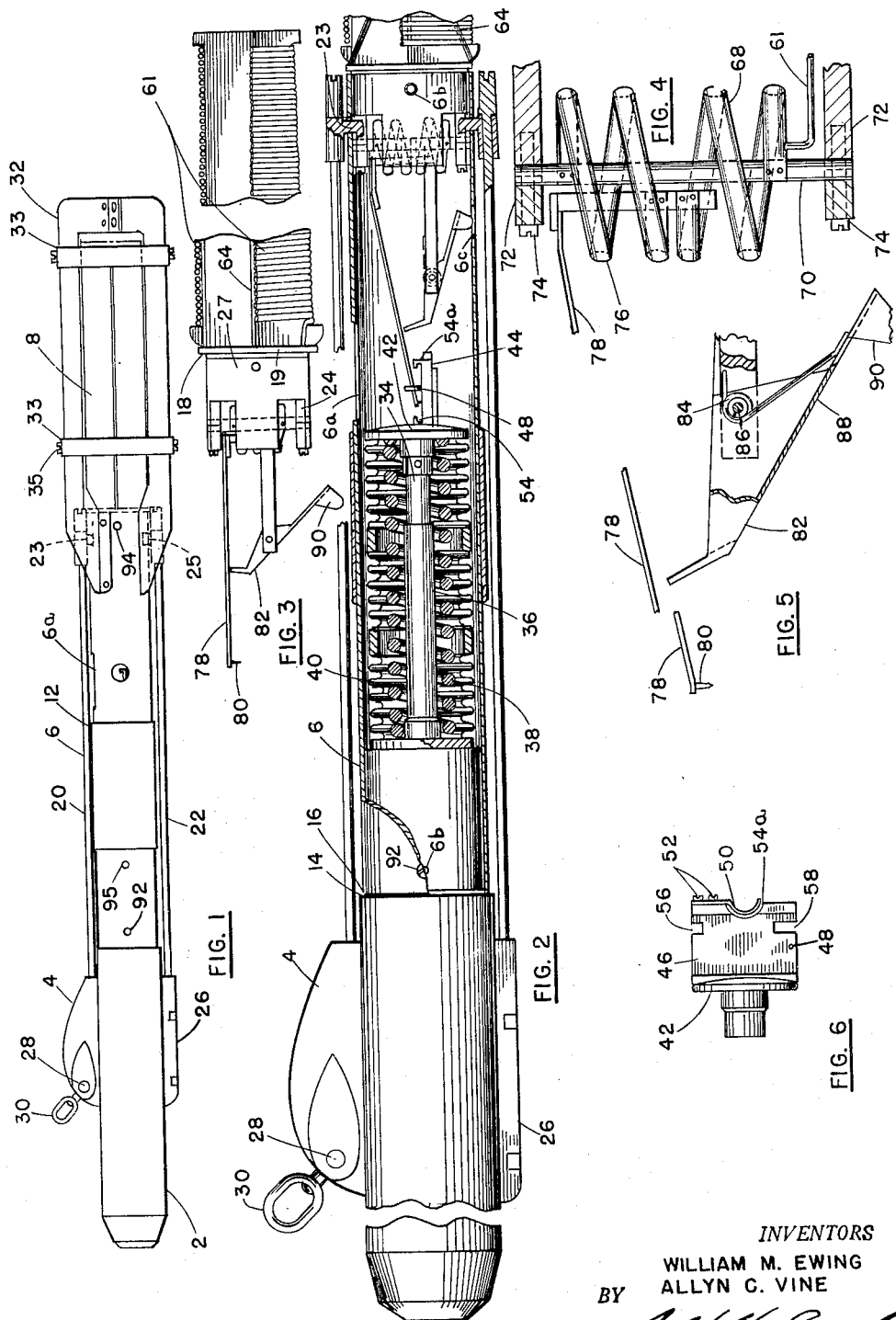
INVENTORS
WILLIAM M. EWING
ALLYN C. VINE
BY
ATTORNEY Patented July 11, 1950

2,515,034

UNITED STATES PATENT OFFICE 2,515,034

BATHYTHERMOGRAPH

William M. Ewing and Allyn C. Vine, Woods Hole, Mass., assignors to the United States of America as represented by the Secretary of the Navy Application May 27, 1944, Serial No. 537,911

6 Claims. (Cl. 73—345)

This invention relates to improvements in bathythermographs, particularly to improvements which will render the instrument capable of taking accurate readings from a vessel moving at a speed up to twenty knots.

Bathythermographs, instruments for recording varying hydrostatic pressures and temperatures of large bodies of water, provide, if accurate, data of value to oceanographers, biologists and fishermen. The data is further particularly useful for the purpose of analysis of the sonic properties of the water examined, which properties are of special interest to submarine operators and crews of anti-submarine and other naval vessels.

It has previously been proposed to provide this data by means of devices for measuring temperatures or temperature gradients at various depths, but such devices have been beset with a variety of disadvantages which render them incapable of designation as precision instruments. One of the principal difficulties of such prior art structures has been their total failure to record significant data from a vessel in rapid motion. Another disadvantage has been that even if used from a stationary vessel (an extremely inconvenient, and in wartime, dangerous procedure), the data obtained has been so inaccurate that the information has been of only limited value for the purpose desired. A serious disadvantage of many of such instruments has been the slow rate of response of the thermal element, whereby a recording of a temperature zone is only made at a substantial time after that zone has been passed by the instrument in lowering or raising and at a time when, in fact, the instrument should be recording another temperature.

It is an object of this invention to provide a bathythermograph having a high speed of thermal response whereby it may be lowered and raised swiftly from a moving vessel while still making an accurate record of the water temperature encountered at various depths, rapidity of lowering being a prerequisite for reading the desired maximum depth when operating from a rapidly moving vessel.

It is a further object of this invention to provide a bathythermograph of compact relatively light form adapted to be towed swiftly and easily through the water offering a minimum resistance to such passage.

Further objects and advantages will appear throughout the specification which include drawings showing a preferred embodiment of the invention, in which:

Fig. 1 is a view in side elevation of a preferred form of the invention;

Fig. 2 is a side elevation partly in section of the forward portion of the instrument, the body tube being removed;

Fig. 3 is a side elevation of the thermal unit, the body tube being removed;

Figure 4 is a side view in elevation of the Bourdon tube arrangement in the thermal unit.

Figure 5 is a side view of the stylus raising means.

Figure 6 is a vertical view of the slide holder.

The general plan of the instrument includes a temperature responsive unit, a pressure responsive unit, and a recording assembly, including means to hold a record receiving slide, whereon the record of both temperature and pressure may be simultaneously made. The pressure being relied upon merely to indicate the depths at which particular temperatures are met, it will be seen that with accurate knowledge of temperature at various depths, a considerable amount of valuable information is calculatable relative particularly to the sonic properties of the water examined.

Means are provided which are movable to a previously determined extent per unit of change in pressure. A thermal responsive unit is provided which moves a stylus or other convenient writing device to a predetermined extent per unit of temperature change. A record plate may preferably be mounted directly upon the movable pressure responsive device and the stylus or other recording device may be mounted to make its record upon the same record plate which moves with the pressure changes. Various convenient means of achieving this relation between pressure and temperature recording are, of course, possible, but we have found it preferable, in view of the desirability of taking repeated observations with a single instrument, to use an insertable slide having a markable surface upon which the stylus may make its record. It will be understood, of course, that it is preferable to arrange that the record plate which holds the slide move in a position roughly perpendicular to the path of movement of the stylus, thus a curve will be obtained on the slide which will be a function of pressure and temperature.

Referring to Fig. 1 the instrument includes generally, a weighted nose piece 2, a towing fin 4, a body tube 6 having therewithin the pressure recording portion of the instrument, and a tail section 8, which with a part of the body tube carries the thermal responsive element 61, the tail section being provided with guide or tail fins 32 which are held spaced by bands 33, and fastened to the body tube 6 as by screws 35.

Situated near the end of the body tube 6 adjacent the tail portion is an opening 6a through which a record slide may be inserted into the slide holder to be described. A sleeve 12 is slidably mounted on the body tube to cover this opening.

It may be seen from Figs. 2 and 3 that the bathythermograph may suitably be manufactured in two parts, which parts are adapted to be separated conveniently for the purpose of cleaning or repairing the instrument. In view of the registration of data from both ends of the instrument, the relation between the two parts of the instrument when assembled must be definite, means are provided for setting the two ends of the instrument against each other in an absolutely positive manner. It is seen from Fig. 2 that the shoulder 14 is cut around the rear portion of the nose 2, a slight indentation 16 being also provided so that the portion of the shoulder 14 which is actually used as a seat for the body tube 6 will be relatively flat. The same type of construction may be employed on the thermal end of the instrument, the shoulder being designated as 18 in Fig. 3. The body tube 6 is adapted to fit one end against the shoulder 14 and the other end against the shoulder 18, and further to assure that an absolute fit occurs between the two ends of the instrument, tie-rods 20 and 22 are employed as may be seen from Fig. 1. These rods are provided on the end adjacent the tail portion 8 with hooks 23 and 25, which extend into holes in the body tube 6 and into the holes formed in trunnion base 27 which key with the holes in the body tube when the instrument is assembled. One of these holes is shown at 24 in Fig. 3. The other ends of the tie-rods 20 and 22 (see Fig. 1) are attached respectively to the towing fin 4 and the tie-rod anchor 26 preferably by threading therein. Screw heads 92 and 94 fit through holes in the body tube 6 into tapped holes 6b in the thermal end and in the nose end of the instrument in such manner that they fix the relation between the pressure responsive and temperature responsive elements with respect to rotation about the axis of the instrument but do not interfere with the function of the tie-rods and shoulders in fixing this relation in other respects. This assembly construction tends to insure that the same relationship is maintained between the pressure registering element and the temperature registering element whenever the two portions of the same instrument are taken apart and reassembled, the necessity of recalibrating the instrument every time it is taken apart for cleaning being thus avoided. Hole 95 through the body tube 6 conveys the pressure of the water to the space around the bellows 40 of the pressure responsive portion of the instrument.

As stated above, previously suggested bathythermographs have not been capable of use from a moving vessel because of their failure to respond quickly enough to thermal changes, and particularly because they were not designed to be pulled through water. As may be seen particularly from Fig. 1, the present construction has been designed with the problem of observation from a moving vessel especially considered. The towing fin 4 carries pivotel thereto by pivot 28, the swivel 30 to which a cable or other suitable attaching means (not shown) may be secured for towing. The nose piece 2 is so fashioned as to be practically solid metal and since the remainder of the instrument beginning very slightly rearward of the towing fin 4 is of substantially hollow construction, most of the weight of the device is in the nose piece, the center of gravity being in that general forward position.

Thus when the instrument is tossed over the side and the cable attached to swivel 30 is payed out freely the tendency will be for the instrument to fall through the water with its axis substantially vertical, the nose piece being pointed down, and tail fins 32 which add to this streamlining effect also enhancing this manner of falling through the water. When the proper depth has been reached, paying out of the cable is stopped and the drawing in of the cable is begun to pull the instrument back to the boat. At this time it will be seen that as the pulling occurs at the swivel 30, which is slightly forward of the center of gravity of the device, the device will be substantially on a line with the towing cable and this position will also be enhanced by the action of the tail fins 32.

It can be seen, therefore, that the combination of the weighted nose and the fins at the tail, together with the generally stream-lined design of the instrument make it possible to provide an instrument light enough in weight to be handled by one man and to be towed by a ship without heavy auxiliary gear, and yet of sufficient weight particularly in the nose to sink rapidly.

Furthermore, the position of the towing fin 4 being substantially forward of the center of gravity, rearward of the nose and off the axis of the instrument, not only makes the instrument suitable for towing but also insures against the twisting of the cable; the mounting off the axis of the instrument being particularly effective to this end. This is, of course, a substantial advantage when it is considered that sometimes over one thousand feet of wire are payed out; a substantial amount of twisting would result in a kink of the wire and sooner or later the loss of the instrument.

Reference is made now particularly to Fig. 2 which illustrates in more detail the pressure responsive portion of the instrument. The pressure element includes the piston 34 and guide cylinder 36 into which piston 34 slides, the cylinder being vented so that air is not trapped and compressed therein. Spring 38 tends to push the piston 34 in a direction toward the right in Fig. 2 and bellows 40, which are preferably evacuated to prevent changes of temperature of air therein from affecting pressure readings, has the opposite effect, the force of the bellows and the spring being in substantial balance and calibrated to produce previously determined expansion or contraction per unit of pressure change on the part of the piston head 42 at varying depths.

To the piston head 42 is secured in perpendicular relation thereto a slide holder 44 which may more particularly be seen in Figs. 2 and 6. The holder 44 includes a flat platform 46 having a stop pin 48 against which the slide is positioned, and a flat retaining spring 50 held on the edge of the platform by screws 52, which spring holds the inserted slide firmly against the bottom of a groove 54 on the side of the platform 46. An opposed groove 54a is recessed as shown in Fig. 6 so that the spring 50 can engage the edge of the slide. The combination of the spring 50 and the pin 48 are adapted to insure that each slide will assume the exact same position in the instrument with relation to the temperature and pressure elements when properly placed therein. A slot 56 in platform 46 insures that the inserted slide shall be seated firmly against pin 48, and a slot 58 of greater depth may be employed to facilitate the thrusting of the slide from pin 48 to remove it after an observation. The opposed grooves 54 and 54a prevent the slide from moving away from the platform 46.

Referring now to Figs. 3 and 4 it is seen that the thermal unit may be considered as a thermometer in which the portion 61, see Fig. 4, is the bulb, and the portion indicated at 68, Fig. 4, is the pressure responsive element. The bulb comprises a very thin hollow tube 61 which preferably may be of copper, filled with xylene and may suitably be of the order of forty to sixty feet in length. This type of thermal unit is well known in the art to have extremely fast and sensitive thermal responsive characteristics.

The tube 61 may preferably be wound upon fins 64 in helical fashion as shown in Figs. 2 and 3 whereby there will be maximum contact between the water through which the instrument passes and the tube, thus insuring quick thermal response.

The remainder of the thermal element, situated to the left of shoulder 18 in Fig. 3 which shoulder is the exterior of a water sealing wall 19 to which tube 61 is soldered where it passes therethrough, includes the Bourdon tube 68 attached to tube 61 and having its fixed end mounted on an axle 70 concentric with the helix of tube 68, said axle being clamped in oppositely disposed trunnions 72, and being held substantially immovable by tightening the screws 74 which may be loosened for the purpose of manually adjusting the zero point.

One of the grave problems heretofore contemplated in bathythermographs has been the necessity of making a correction in the thermal unit for the stem of the thermometer. It is futile to provide the copper tube 61 as a bulb for particularly quick thermal response, only to lose the sensitivity in the Bourdon portion of the thermometer itself, the thicker wall of the Bourdon portion responding less rapidly to changes in temperature. To obtain this sensitivity it has been previously proposed to ventilate this portion of the instrument so that a large quantity of water reaches it and make it respond as rapidly to temperature changes as the bulb. However, since the stylus for recording the temperature is directly attached to the instrument, a considerable rush of water past the Bourdon tube results in a substantial amount of vibration which spoils the recording function of the stylus and results in inaccurate data.

A compensator 76, which in the drawing is shown as an oppositely turned Bourdon tube but may be a bimetal element (not shown), is mechanically connected at one end to the axle 70 and at the other attached to the Bourdon tube 68 at its free end, although not joined to the copper tube 61. It is seen that any expansion due to a temperature rise in the first Bourdon tube 68 is met by an equal expansion of the tube 78, and is not recorded with the actual temperature of the copper tube 61.

To the end of the compensator 76 where it is secured to the Bourdon tube 68 is secured a stylus arm 78 having a stylus 80, which when the instrument is assembled is mounted to bear directly on the surface of slide holder 44, and when a record slide is placed therein to trace a record thereon of temperatures encountered according to the expansion and contraction of the Bourdon tube 68 and the consequent movement of the stylus.

When the desired amount of cable has been payed out in making an observation, and the pulling in of the instrument is started, a violent change of direction of the entire instrument takes place substantially reversing its direction of movement. This change of direction takes place in the plane containing the fin 4 and the axis of the instrument. It can be seen that if the stylus arm 78 were also mounted for movement in this plane, a violent jerk thereof would occur at this point which would result in a record on the slide not reflecting a temperature change. Hence the slide holding plate 44 is preferably mounted in position perpendicular to the plane described above, as may be seen from Fig. 2, and since the stylus arm 78 moves across this surface it is little affected by the sudden reversal in position of the instrument.

It will be understood, of course, that in order to place the record slide into the instrument it is necessary that the stylus 80 be out of contact with the slide both while it is being inserted and while it is being withdrawn. To achieve that end there is provided a pivoted member 82 which in normal position, pressed by spring 84, engages the stylus arm 78 to keep the stylus 80 out of slide engaging relation. Member 82 is fixed to shaft 86 which is journalled for rotation. Member 82 has arm 88 which mounts cam member 90 which protrudes a short distance through a slot 6c in tube body 6 when sleeve 12 is slid forward. The sleeve 12, which slides over the record slide insertion opening 6a of the tube in order to insert or remove a record slide, bears against the cam 90 when it is moved to closed position, and rotates the member 82 and shaft against the pressure of the spring 84 in a counter-clockwise direction, to remove the pressure of the member 82 from the stylus arm 78 and allow the stylus 80 to engage the record slide. Consequently, it is seen that when the sleeve is closed the record slide is engaged by the stylus and when the sleeve is opened for the purpose of removing a slide, the stylus is automatically lifted by the action of spring 84.

The operation of the instrument is as follows. A smoked slide is inserted on the plate 44; the sleeve 12 is slid closed; the instrument is permitted to lower into the sea for the desired depth, the record being made on the slide of temperature changes with pressure or depth changes. When the desired depth has been reached the instrument is withdrawn (a similar record being made on the upward trip) and the slide is removed for analyzing the data. The instrument is now ready to receive another slide for another observation.

It will be understood, as previously stated that the above description and accompanying drawings comprehend only the general and preferred embodiment of the invention and that various changes in construction, proportion and arrangement of the parts may be made within the scope of the appended claims without sacrificing any of the advantages of the invention.

We claim:

1. A bathythermograph of generally tubular shape having means for attachment to a towing cable including an attaching fin mounted on said tubular member off the axis of said bathythermograph and spaced between the ends thereof, said bathythermograph having a record plate mounted in a plane perpendicular to the plane containing the axis of the instrument and the point of attachment, and parallel to the axis of the instrument; and a recording stylus movable about an axis parallel to the plane of said record plate.

2. A bathythermograph having a temperature responsive element comprising in general a thermometer having a bulb and a Bourdon tube, said tube being mounted on an axle concentric with the helix of the tube and passing therethrough, said axle being adjustably clamped in oppositely disposed trunnions.

3. A bathythermograph comprising a cylinder, a first pressure responsive device in the forward portion of said cylinder, a temperature responsive thermometer tube mounted on the rear of said cylinder, a second pressure responsive device comprising a double Bourdon tube, one half of said tube being connected to said thermometer tube and the other half adapted to nullify temperature changes of said first half, a single recording device connected to both said first and second devices, and means for renewing said recording device without disassembly of said cylinder.

4. An instrument as claimed in claim 3 wherein said cylinder has stabilizing fins at the rear thereof and a means for attachment to a towing cable including a swivel incorporated in a fin on said cylinder and off the axis thereof and positioned substantially at the center of gravity of said instrument.

5. A bathythermograph comprising a cylinder, a pressure responsive device in one end of said cylinder, a temperature responsive device in the other end of said cylinder, and a single recording means connected to both devices, said means including a double Bourdon tube connected one half to the temperature responsive device, the other half adapted to nullify expansions of said first half due to temperature changes.

6. An instrument as described in claim 5 in which said cylinder has fins at the rear thereof and a means for attachment to a towing cable including a swivel incorporated in a fin on said cylinder and off the axis thereof and positioned substantially at the center of gravity of said instrument.

WILLIAM M. EWING.
ALLYN C. VINE.

REFERENCES CITED

The following references are of record in the file of this patent:

UNITED STATES PATENTS

| Number | Name | Date |
| --- | --- | --- |
| 1,165,934 | Amthor | Dec. 28, 1915 |
| 1,798,645 | Withers | Mar. 31, 1931 |
| 1,969,141 | McDonald | Aug. 7, 1934 |
| 2,015,851 | Herrick et al. | Oct. 1, 1935 |
| 2,297,725 | Spilhaus | Oct. 6, 1942 |
| 2,331,810 | Spilhaus | Oct. 12, 1943 |